Oct. 26, 1965     G. B. LUNDEVALL ETAL     3,214,268
METHOD OF EXTRACTION OF Zn, Cd AND SIMILAR EASILY
VOLATILIZED METALS FROM WASTE METAL WHICH
CONTAINS HEAVY METALS
Filed April 27, 1962
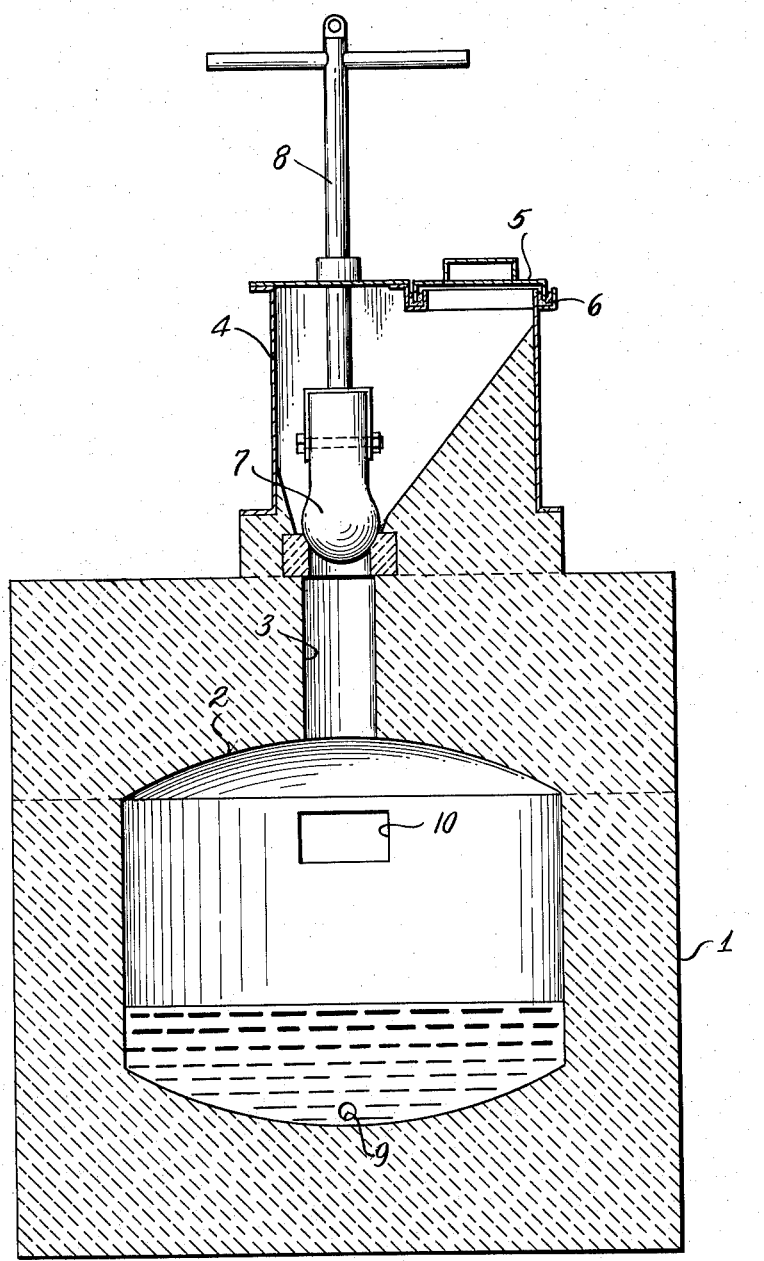
INVENTORS
GUSTAV BLOM LUNDEVALL
MATHIAS ÖVROM SEM
BY *Thomas B. Graham*
ATTORNEY 3,214,268
METHOD OF EXTRACTION OF Zn, Cd AND SIMILAR EASILY VOLATILIZED METALS FROM WASTE METAL WHICH CONTAINS HEAVY METALS
Gustav Blom Lundevall, Larviksveien, Stavern, Norway, and Mathias Øvrom Sem, Holmenkollveien 12, Smestad, Oslo, Norway
Filed Apr. 27, 1962, Ser. No. 190,720
Claims priority, application Norway, June 7, 1961, 140,459
4 Claims. (Cl. 75—63)

In the galvanizing of iron and steel materials according to the hotdip process a so-called galvanizer's dross or hard zinc is formed, which is a zinc alloy containing usually 2–6 percent iron. This alloy separates from the galvanizing bath as a paste which must be removed as it would otherwise cause an inferior coating and increase the heat requirement of the bath.

The hard zinc is, because of its high contents of zinc, a valuable by-product from which zinc may be recovered by means of a distillation process. This distillation is usually carried out in closed retorts which must be opened periodically in order to remove residues of iron and other impurities. The residue is present in solid state and must be scraped out of the retort.

The iron residue will also be separated out on the furance bottom in an unmolten state, in electric distillation furnaces which operate continuously. To avoid the periodical opening of the furnace to scrape out the residue it has been necessary to raise the temperature of the furnace to a point at which the residue will melt and may be removed in molten state through a tapping spout. As will be known pure iron melts first at temperatures of about 1600° C. By such increase of the temperature the refractory lining of the furnace will be subjected to serious strains, and the heat losses from the furnace will simultaneously increase. This fusing off of the furnace also requires considerable time, and the zinc vapours will be rather impure during this period because of the high temperature.

Applicants have in this connection developed a method which greatly facilitates the furnace operation. The method consists in lowering the smelting temperature of the residue to the extent that the residue will melt and can be tapped from the furnace at the normal operating temperature of the furnace, or close to this temperature, i.e. at about 1000–1200° C. Applicants have found that the smelting temperature of the residue may be lowered by the introduction of a phosphorus containing material. The phosphorus will then combine with the iron contents of the residue and lower the melting point of the residue sufficiently to obtain the residue in molten state so that it can be tapped in liquid form. An addition of about 11% phosphorus as a ferro-alloy as for instance ferro-phosphorus will lower the melting point to about 1000° C. Ferro-phosphorus is obtaned as a by-product by production of elementary phosphorus, and is therefore available for a resonable price. The contents of phosphorus in ferro-phosphorus is generally about 28 percent P. It has been proved that the melting point of the residue may be sufficiently lowered by an addition of ferro-phosphorus which gives only a about 2–4 percent P in the residue.

It has proved advantageous to supply the necessary amount of ferro-phosphorus to the furnace when the bulk of the zinc has been distilled off, but before sharply increased furnace temperatures are required to produce vapour from the partially exhausted furnace charge.

Here it is important that the P alloy be introduced through a so-called cup valve, which prevents the zinc vapours from escaping into the furnace area and air from being sucked into the furnace at possible diminished pressure in the furnace. Addition of zinc sulphide (ZnS) will give a result similar to ferro-phosphorus. The zinc sulphide will combine with the iron contents of the residue in the formation of FeS which melts at about 1100° C. That amount of zinc which is introduced with the sulphide will then be distilled over and recovered as metallic zinc. Possible slag forming components in the sulphide will melt and can be tapped from the furnace together with the iron.

The method is described above in connection with working of hard zinc. It is, however, evident that the method may also be utilized in connection with other waste products which contain Zn, Cd, Pb, etc. The invention is thus not limited to the above described distillation process. Also other metallic impurities than iron as for instance nickel may be removed according to the method.

The invention is schematically illustrated on the attached drawing which shows an arrangement for introduction of the additional material. On the figure, 1 indicates the furnace and 2 the furnace roof. 3 is an opening through which the additional material is introduced into the furnace. 4 indicates a container which is arranged above the furnace and covered by means of a lid 5 equipped with a sand seal 6. The opening 3 in the furnace cover will usually be kept closed by means of the plug 7, which may be raised by means of the rod 8 when the addition shall take place. 9 indicates a tapping hole and 10 the opening through which the zinc vapours are conducted to the condenser.

The material which lowers the melting point of the heavy metal should preferably be introduced when the bulk of the volatile metal has been distilled off. The purest zinc is obtained in this way.

The method may be varied in different ways within the frame of the application.

We claim:
1. A method for the furnace distillation of volatile metals from their alloys with heavy metals, comprising adding a reactant to the furnace to convert the heavy metal into a compound having a melting point lower than the melting point of the heavy metal and also close to the distillation temperature of the volatile metal, said reactant being selected from the group consisting of phosphorus, ferro-phosphorus and zinc sulphide, making said addition during distillation, the compound of the said heavy metal being melted, separating the heavy metal compound from the furnace in molten state, said conversion of heavy metal to a compound being at a point in the distillation when the bulk of the volatile metal has been removed by distillation.

2. Method according to claim 1, characterized in that the heavy metal is converted to a phosphorus compound by addition of ferro-posphorus.

3. Method according to claim 1, characterized in that the heavy metal is converted into a sulphur compound by addition of zinc sulphide.

4. Method according to claim 1, wherein the alloy treated is hard zinc containing about 2–6 percent iron as impurity, characterized in that ferro-phosphorus is supplied in such amount that the resulting heavy metal compound in the furnace will contain at least 2 percent phosphorus.

(References on following page)

References Cited by the Examiner

UNITED STATES PATENTS

| | | | |
|---|---|---|---|
| 1,817,068 | 8/31 | Cyr et al. | 75—68 X |
| 2,144,914 | 1/39 | Debuch | 75—86 |
| 2,598,743 | 6/52 | Waring et al. | 75—86 X |
| 2,598,745 | 6/52 | Handwerk et al. | 75—86 X |

OTHER REFERENCES

Metals Handbook, 1948 edition, American Society for Metals, Cleveland, Ohio, pp. 1182, 1213 and 1215.

BENJAMIN HENKIN, *Primary Examiner.*

WINSTON A. DOUGLAS, DAVID L. RECK,
*Examiners.*